W. H. GILBERT.
FINDER FOR CAMERAS.
APPLICATION FILED FEB. 2, 1921.

1,438,230.

Patented Dec. 12, 1922.

Inventor:
Woodland H. Gilbert,
By: John E. Styles
his Attorney

Patented Dec. 12, 1922.

1,438,230

UNITED STATES PATENT OFFICE.

WOODLAND H. GILBERT, OF ST. PAUL, MINNESOTA.

FINDER FOR CAMERAS.

Application filed February 2, 1921. Serial No. 441,776.

*To all whom it may concern:*

Be it known that I, WOODLAND H. GILBERT, a citizen of the United States, residing at St. Paul, in the county of Ramsey and State of Minnesota, have invented new and useful Improvements in Finders for Cameras, of which the following is a specification.

My invention relates to improvements in finders for cameras.

My object is to provide a simple and efficient device of this kind which may be attached to any kodak or camera to facilitate exact centering of the image of the object to be photographed, on a film or sensitive plate.

Other objects of my invention will appear and be more fully pointed out in the following specification and claims.

The accompanying drawings illustrate what I at present believe to be the best form of my device but it will be readily understood that modifications are possible within the spirit of my invention.

Figure 1:
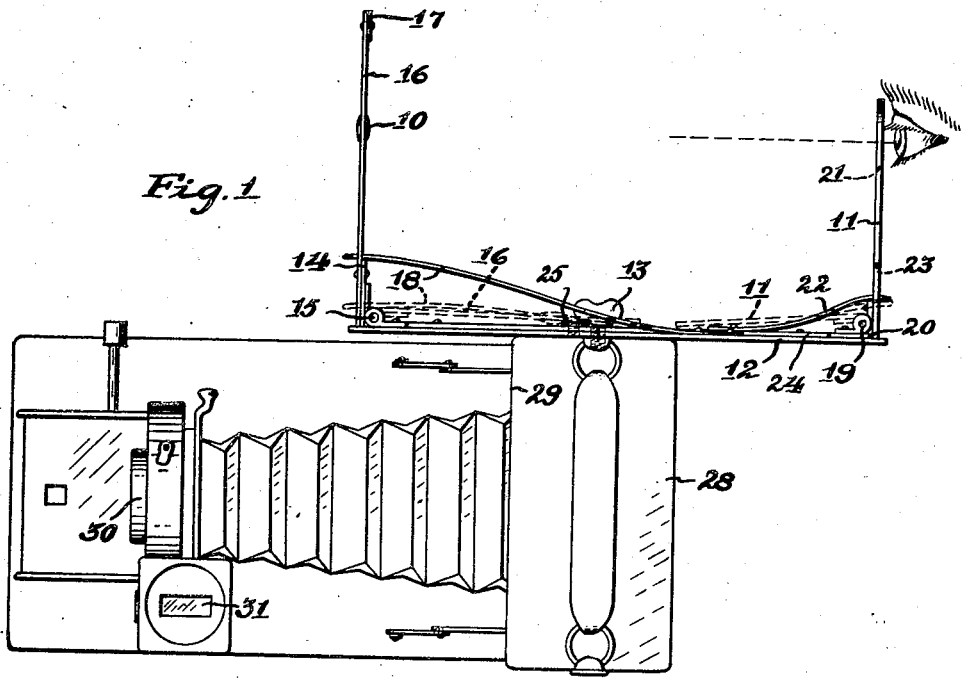
Figure 2:
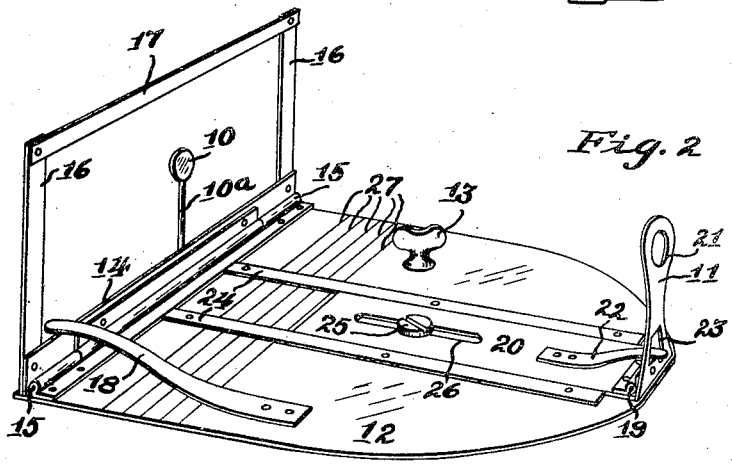

Referring to the drawings Figure 1 is an elevation of my improved finder mounted on a camera of common type and Fig. 2 is a perspective view of my device detached from the camera.

My device consists of a front sight 10 and a rear sight 11, mounted at opposite ends of a base plate 12, the latter being designed to be secured to a camera by means of a wing bolt 13. The front sight 10 is in the nature of a small disc mounted on the upper end of a spindle 10ª which is rigidly secured at its lower end to a transverse bar 14. This bar is tiltably fastened along the front edge of the base 12 by means of a hinge 15. Rigidly fastened to the ends of the bar 14 is a pair of normally vertical strips 16 which are attached at their upper ends to a transverse strip 17. It will thus be seen that the bar 14 together with the strips 16 and 17 form a rectangular frame adapted to assume a perpendicular position when in use and to lie flat upon the base plate 12 when not required. A spring 18 is riveted to the base plate 12 and presses upon the bar 14 to hold the rectangular frame and sight 10, in a plane perpendicular to the base plate 12.

The rear sight 11 is connected at its lower end by a hinge 19 to an adjustable plate 20 hereinafter described. The upper end of the sight 11 is formed with a circular perforation 21 and is adapted to be normally held in a position perpendicular to the plate 12 by a spring 22. This spring is riveted at one end to the plate 20 and engages the sight 11 in a perforation 23 through which said spring projects.

Riveted to the base plate 12 and extending at right angles to the hinge 15 is a pair of guides 24 for the plate 20. These guides are undercut at their adjacent edges and the longitudinal edges of the plate 20 are correspondingly beveled so that said plate is held upon the upper surface of the plate 12 but free to slide longitudinally thereon between the guides 24. A set screw 25 passing through a slot 26 in the plate 20 and threaded in the plate 12 at its lower end is adapted to impinge upon the upper surface of the plate 20 to hold said plate in any desired position. A series of parallel lines 27 are marked upon the upper surface of the plate 12, parallel to the hinge 15 and at right angles to the guides 24.

In use my improved finder is attached to a camera body 28 by inserting the threaded lower end of the wing bolt 13 in the tapped hole provided for the tripod in common styles of cameras and kodaks. Before tightening the bolt 13 one of the lines 27 is placed in coincidence with or parallel to the front surface 29 of the camera body. This correctly adjusts the line of sight between the center of the perforation 21 and the front sight 10 with the focal axis of the lens 30 of the kodak. The distance between the front and rear sights 10 and 11 is now adjusted by means of the set screw 25 so that this distance is the same as the focal length of the lens 30, or in other words, so that the field of vision included within the frame formed by the bar 14 and strips 16 and 17 (when the sight 11 is placed close to the eye, as shown in Figure 1) will include the same objects as the image on the film within the kodak 28.

In taking a picture with my improved finder the sight 11 is placed close to the eye, as shown in Figure 1, and the object or objects which it is desired to photograph are observed through the perforation 21, the front sight 10 being placed on the object it is desired to have in the center of the photograph, after which the exposure is made in the usual manner. The sights 10 and 11 and rectangular frame may be turned down when not in use as shown in dotted lines in Figure 1.

The difficulty of centering objects, and particularly moving objects, by means of the usual type of finder 31 is well known, but with my improved finder this difficulty is entirely obviated by permitting a direct view of the object to be photographed and at the same time providing a sight and a limiting frame for the field of vision.

Having described my invention what I claim as new and desire to protect by Letters Patent:

1. In a finder for a camera having a tapped hole therein, a base plate, a screw adapted to be inserted in said hole and thereby secure said plate to the camera, said plate being formed with means for aligning the same with the focal axis of the camera, front and rear sights mounted on said plate and a hollow rectangular frame surrounding said front sight whereby the field of vision may be limited to coincide with the image to be photographed.

2. In a device of the class described a base plate adapted to be secured to a camera, a front sight at one end of said plate, a rear sight slidable toward and away from said front sight on the opposite end of said plate and means for securing said rear sight in predetermined positions.

3. In a device of the class described a base plate adapted to be secured to a camera, said plate being formed with a plurality of parallel lines so that one of said lines may be placed in coincidence with one edge of the camera, a front sight at one end of said plate, a rear sight slidable toward and away from said front sight on the opposite end of said plate and means for securing said rear sight in predetermined positions.

In testimony whereof, I have hereunto signed my name to this specification.

WOODLAND H. GILBERT.